US009878280B1

(12) United States Patent
Nakano et al.

(10) Patent No.: US 9,878,280 B1
(45) Date of Patent: Jan. 30, 2018

(54) METHOD FOR GENERATING $O_2$-RICH GAS FROM AIR USING WATER

(71) Applicants: Anna Nakano, Albany, OR (US);
Jinichiro Nakano, Albany, OR (US);
James P. Bennett, Salem, OR (US)

(72) Inventors: Anna Nakano, Albany, OR (US);
Jinichiro Nakano, Albany, OR (US);
James P. Bennett, Salem, OR (US)

(73) Assignee: U.S. Department of Energy, Washington, DC (US)

( * ) Notice: Subject to any disclaimer, the term of this patent is extended or adjusted under 35 U.S.C. 154(b) by 385 days.

(21) Appl. No.: 14/590,239

(22) Filed: Jan. 6, 2015

(51) Int. Cl.
*B01F 3/04* (2006.01)
*B01D 53/14* (2006.01)
*B01D 53/18* (2006.01)

(52) U.S. Cl.
CPC ......... *B01D 53/1406* (2013.01); *B01D 53/14* (2013.01); *B01D 53/1418* (2013.01); *B01D 53/18* (2013.01); *B01F 3/04* (2013.01); *B01D 2257/40* (2013.01)

(58) Field of Classification Search
CPC ....... B01F 3/04; B01D 53/14; B01D 53/1406; B01D 53/1418
USPC ............................ 95/149, 156, 169, 172, 177
See application file for complete search history.

(56) References Cited

U.S. PATENT DOCUMENTS 1,056,244 A * 3/1913 Wiley .................. C01B 3/52
422/120
5,167,806 A 12/1992 Wang et al.

OTHER PUBLICATIONS

Golshani et al., Oak Ridge National Laboraory, Ocean Thermal Energy Conversion Gas Desorption Studies, vol. 1 Design of Experiments, ORNL/TM-7438/V1 (1980) pp. 11-15.

* cited by examiner

*Primary Examiner* — Robert A Hopkins
(74) *Attorney, Agent, or Firm* — Timothy L. Harney; Daniel D. Park; Brian J. Lally

(57) ABSTRACT

The present disclosure is directed to a method for enriching an inlet air stream utilizing a number of enrichment sub-units connected in series, where each enrichment sub-unit conducts both a dissolution and degasification cycle. Each enrichment sub-unit comprises a compressor, an aeration unit, a deaeration unit, and a pump for the recirculation of water between the aeration and deaeration units. The methodology provides a manner in which the relationship between the respective Henry's coefficients of the oxygen and nitrogen in water may be exploited to enrich the $O_2$ volume percent and diminish the $N_2$ volume percent over repeated dissolution and degasification cycles. By utilizing a number of enrichment sub-units connected in series, the water contained in each enrichment sub-unit acts to progressively increase the $O_2$ volume percent. Additional enrichment sub-units may be added and utilized until the $O_2$ volume percent equals or exceeds a target $O_2$ volume percent. In a particular embodiment, air having a general composition of about 78 vol. % $N_2$ and 21 vol. % $O_2$ is progressively enriched to provide a final mixture of about 92% vol. % $O_2$ and 8% vol. % $N_2$.

8 Claims, 3 Drawing Sheets

METHOD FOR GENERATING O₂-RICH GAS FROM AIR USING WATER

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments describes a method for increasing the $O_2$ vol. % and decreasing the $N_2$ vol. % of an inlet gas stream of air through sequential aeration and deaeration cycles using water.

BACKGROUND

Industrial technologies used for oxygen or oxygen-rich gas production are based on oxygen separation from air (78 volume percent (vol. %) nitrogen, 21 vol. % oxygen), and include distillation (cryogenic), adsorption and membrane approaches. The cryogenic method for oxygen separation is the most commonly used air separation technology. In this method, air is filtered, compressed, and chilled to the ultralow (cryogenic) temperature of about −185° C. The cryogenic method reliably produces large quantities of oxygen needed by industry; however, it is complex, expensive and, energy intensive. Other air separation methods used by industry involve nitrogen adsorption on materials such as by zeolites via pressure swing adsorption (PSA), or polymeric/ceramic membranes.

Research to develop/improve oxygen separation targets large-scale (>100 t/day) use by industry. Polymeric membranes are currently limited to the production of oxygen enriched air, with an oxygen concentration of no more than 40 vol. %. The use of high temperature (up to 900° C.) ceramic-based membranes results in increased oxygen purity, but may have technical issues that include significant energy penalty associated with large volume gas heating. The need for new methodology for oxygen production exists which is economical, environmentally friendly, and applicable to large-scale production.

It would be advantageous to provide an alternate method of air separation, for example through repeated aeration and deaeration cycles of water.

Aeration is well known and normally among the first treatment steps employed during the production of drinking water or the treatment of waste waters. Aeration artificially induces gas transfer for the addition of oxygen in order to affect removal of various volatile compounds. Generally in these processes, air bubbles are generated by various processes in liquid-gas mixing vessels, and a swarm of air bubbles provides a large air-to-liquid interface area for separation of soluble surface active substances. In other applications, the swarm of air bubbles functions primarily as a means to increase dissolved oxygen contents in a volume of water, in order to support bacteria or other microorganisms for digestion of biodegradable compounds. These processes are well known, however the gaseous dissolution of oxygen and nitrogen which these processes inherently invoke is not intended to provide an air separation, and the oxygenated waters are typically released to holding vessels where any excess gases release to the atmosphere. Deaeration of water is additionally well known and practiced in applications where dissolved oxygen levels in water are intentionally minimized, such as beverage production and boiler water treatments, however in these deaeration operations, the oxygen removed typically originates as an incidentally introduced constituent, and the gases which evolve during deaeration are generally discarded. Additionally, the deaeration operations typically also utilize a stripping gas such as steam or nitrogen, diluting the concentration of any oxygen which might result. These aeration and deaeration processes have not been integrated in a system whereby an aeration operation followed by a deaeration operation is utilized for the purpose of generating an outlet gas stream having an increased $O_2$ level and decreased $N_2$ level, as is the goal in air separation processes generally.

Provided here is a method for enriching an inlet air stream comprising $O_2$ and $N_2$ by repeated dissolution and subsequent escape of oxygen and nitrogen in water through the use of an enrichment sub-unit conducting sequential aeration and deaeration operations. Within the method, the relationship between the respective Henry's coefficients of the oxygen and nitrogen in water are exploited in order to progressively increase the $O_2$ vol. % in a gas stream to a target $O_2$ vol. %. The method takes advantage of the fact that water has a stronger chemical affinity for $O_2$ than for $N_2$, and generates enriched outlet gas streams by a subsequent degasification of $O_2$ and $N_2$ from aerated water. The method may be conducted generally at room temperature, and allows enrichment of an air stream to a final gas stream comprising over 90 vol. % $O_2$.

These and other objects, aspects, and advantages of the present disclosure will become better understood with reference to the accompanying description and claims.

SUMMARY

The present disclosure is directed to a method for enriching an inlet air stream comprising $O_2$ and $N_2$ by repeated dissolution and subsequent escape of the oxygen and nitrogen in water. By utilizing a number of enrichment sub-units connected in series, where each enrichment sub-unit conducts both a dissolution and degasification cycle, the water contained in each enrichment sub-unit acts to progressively increase the $O_2$ vol. % until the $O_2$ vol. % equals or exceeds a target $O_2$ vol. %. The proposed method takes advantage of the fact that water has a stronger chemical affinity for $O_2$ than for $N_2$ and manipulates surrounding conditions such that sequential aeration and deaeration operations progressively increase the $O_2$ vol. % while decreasing the $N_2$ vol. %.

Henry's coefficient for oxygen in water is about 769 atm·l/mol while that for $N_2$ is about 1639 atm·l/mol at 25° C. A division of these coefficients indicates $O_2$ possesses a much larger chemical affinity to water—more than twice as much as $N_2$. This produces an arrangement where the $O_2$-to-$N_2$ ratio in the volume of water at equilibrium is always higher than that of the gaseous oxygen-nitrogen mixture contacting the volume of water. Consequently, if the gases are subsequently degassed from the volume of water, a new atmosphere is generated having a higher $O_2$-to-$N_2$ ratio than the initial oxygen-nitrogen mixture at which dissolution occurred.

The methodology disclosed herein exploits this tendency through repeated dissolution and degasification cycles in order to sequentially increase the volume percent of $O_2$ while decreasing the volume percent of $N_2$ using a series of enrichment sub-units. Each enrichment sub-unit comprises a compressor, an aeration unit, a deaeration unit, and a pump for the recirculation of water between the aeration and deaeration units. The output gas stream of a given enrichment sub-unit is subsequently operated on by an additional enrichment sub-unit until the final gas stream has an $O_2/N_2$ ratio greater than or equal to a desired target. In a particular embodiment where the target $O_2$ vol. % is 90 vol. %, a first enrichment sub-unit receives air having a general composition of about 78 vol. % $N_2$ and 21 vol. % $O_2$ and conducts a dissolution and degasification using the air and water to generate an outlet stream of about 36% vol. % $O_2$ and 64% vol. % $N_2$. This outlet stream is collected and directed to an additional enrichment sub-unit which conducts similar operations, and generates and further enriches the gas stream to about 55% vol. % $O_2$ and 45% vol. % $N_2$. This is progressively continued with additional enrichment sub-units to generate a gas mixtures of about 72% vol. % $O_2$ and 28% vol. % $N_2$, about 85% vol. % $O_2$ and 15% vol. % $N_2$ and a final mixture of about 92% vol. % $O_2$ and 8% vol. % $N_2$. Higher purifications can be achieved with additional enrichment sub-units.

The disclosure thus provides a method of enriching an inlet air stream comprising $O_2$ and $N_2$ by repeated dissolution and degasification of the oxygen and nitrogen in water. The methodology provides a manner in which the relationship between the respective Henry's coefficients of the oxygen and nitrogen in water may be exploited to enrich the $O_2$ vol. % and diminish the $N_2$ vol. % over repeated dissolution and degassing cycles. By utilizing a number of enrichment sub-units connected in series, where each enrichment sub-unit conducts both a dissolution and degassing cycle, the water contained in each enrichment sub-unit acts to progressively increase the $O_2$ vol. %. Additional enrichment sub-units may be added and utilized until the $O_2$ vol. % equals or exceeds a target $O_2$ vol. %.

The novel process and principles of operation are further discussed in the following description.

DETAILED DESCRIPTION

Figure 1:
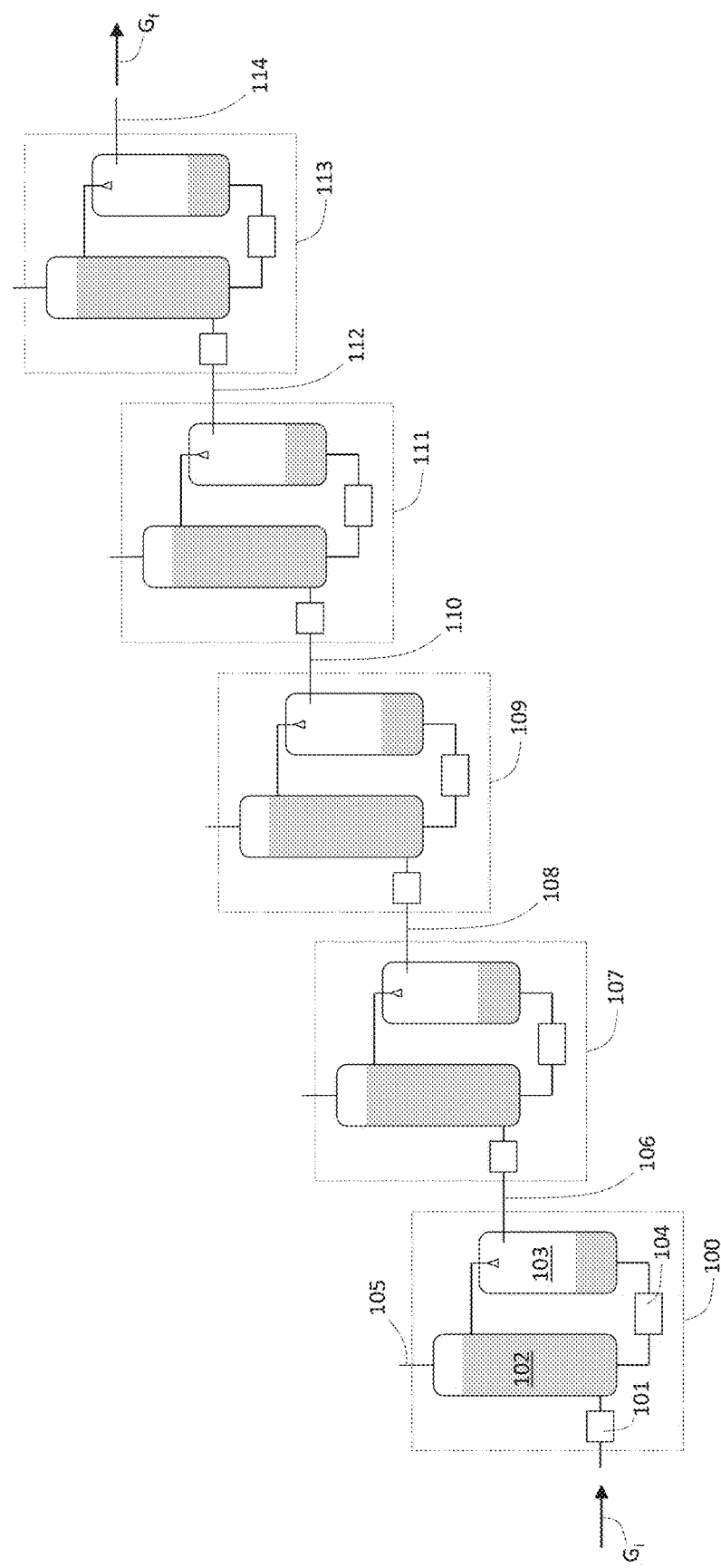
FIG. 1 illustrates an embodiment of the method using a series of enrichment sub-units.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for increasing the $O_2$ vol. % and decreasing the $N_2$ vol. % of an inlet gas stream of air through sequential aeration and deaeration cycles using water.

The methodology enriches an inlet air stream comprising $O_2$ and $N_2$ by repeated dissolution and degassing of the oxygen and nitrogen in water. The methodology provides a manner in which the relationship between the respective Henry's coefficients of the oxygen and nitrogen in water may be exploited to enrich the $O_2$ vol. % and diminish the $N_2$ vol. % over repeated dissolution and degasification cycles. By utilizing a number of enrichment sub-units connected in series, where each enrichment sub-unit conducts both a dissolution and degassing cycle, the water contained in each enrichment sub-unit acts to progressively increase the $O_2$ vol. % until the $O_2$ vol. % equals or exceeds a target $O_2$ vol. %.

As is understood, air is composed of about 78 vol. % $N_2$, about 21 vol. % $O_2$, and small fractions of other gases. Typically in this methodology, air is used as an $O_2$ source while water serves as an enriching medium. The proposed method does not require any other chemicals or materials like physical membranes, but rather takes advantage of the fact that water has a stronger chemical affinity for $O_2$ than for $N_2$, and subsequently $O_2$ has more potential to dissolve in water than $N_2$. Although this seems to contradict the fact that more $N_2$ is found in earth's fresh water than oxygen, this is because concentrations of gas species in water are determined not only by chemical affinity, but also by atmospheric concentrations, where nitrogen is the predominant gas species. Higher solubility of a particular gas species in water can be induced if surrounding conditions are appropriately manipulated with respect to chemical affinity.

By assuming chemical affinity of $O_2$ and $N_2$ to liquid water is expressed by respective Henry's coefficients, equilibrium concentrations of $O_2$ and $N_2$ in a volume of water exposed to a gaseous oxygen-nitrogen mixture can be determined by:

$$[O_{2(H2O)}] = P_{TOTAL} \frac{[O_{2(GAS\ MIX)}]}{H^{O2}} \quad (1)$$

$$[N_{2(H2O)}] = P_{TOTAL} \frac{[N_{2(GAS\ MIX)}]}{H^{N2}} \quad (2)$$

In the above, $[O_{2(H2O)}]$ is the concentration of oxygen in the volume of water, $[O_{2(GAS\ MIX)}]$ is the concentration of oxygen in the gaseous oxygen-nitrogen mixture contacting the volume of water, $P_{TOTAL}$ is the total pressure of the gaseous oxygen-nitrogen mixture contacting the volume of water, and $H^{O2}$ is Henry's coefficient for oxygen in water. Similarly, $[N_{2(H2O)}]$ is the concentration of nitrogen in the volume of water, $[N_{2(GAS\ MIX)}]$ is the concentration of nitrogen in the gaseous oxygen-nitrogen mixture contacting the volume of water, $P_{TOTAL}$ is the total pressure as before, and $H^{N2}$ is Henry's coefficient for nitrogen in water. As is known, Henry's coefficient for oxygen in water is about 769 atm·l/mol while that for $N_2$ is about 1639 atm·l/mol at 25° C. A division of these coefficients indicates $O_2$ possesses much larger chemical affinity to water, more than twice as much as $N_2$. This produces an arrangement where the $O_2$-to-$N_2$ ratio in the volume of water at equilibrium is always higher than that of the gaseous oxygen-nitrogen mixture at $P_{TOTAL}$ which contacts the volume of water. Consequently, if the gases subsequently effervesce from the volume of water, a new atmosphere generates having a higher $O_2$-to-$N_2$ ratio than the initial oxygen-nitrogen mixture at which dissolution occurred. For example, if a volume of water equilibrates with a contacting gas atmosphere of air comprising about 78 vol. % $N_2$ and 21 vol. % $O_2$ at about room temperature and some pressure $P_{TOTAL}$, then the volume of water would be expected to contain a total dissolved gas species comprised of about 36 vol. % $O_2$ and 64 vol. % $N_2$. If this volume of water is subsequently subjected to an atmosphere whereby a large portion of the $O_2$ and $N_2$ gases effervesce, such as a vacuum, than degasification of the $O_2$ and $N_2$ will establish a new atmosphere having a composition of about 36 vol. % $O_2$ and 64 vol. % $N_2$, due to the $O_2$-to-$N_2$ ratio established in the volume of water under the previous atmosphere. Similarly, if this generated 36 vol. % $O_2$/64 vol. % $N_2$ mixture is subsequently exposed to a volume of water and the pressure is increased generally back to $P_{TOTAL}$, the volume of water generally at equilibrium will contain total dissolved gas species comprised of about 55 vol. % $O_2$ and 45 vol. % $N_2$ at room temperature, and subsequent degasification to release this $O_2$ and $N_2$ will generate a new mixture having a corresponding composition of about 55 vol. % $O_2$ and 45 vol. % $N_2$. By repeating this procedure an additional three times, a final gas mixture may be obtained having an $O_2$ composition of over 92 vol. %.

The methodology disclosed herein exploits this tendency through repeated dissolution and degasification cycles in order to sequentially enrich the concentration of $O_2$ present in a mixture with $N_2$. This process is generally represented at FIG. 1, where an enrichment sub-unit bounded by 100 comprises an aeration unit 102 and a deaeration unit 103, as well as a compressor 101 and a pump 104. Enrichment sub-unit 100 receives an inlet air mixture $G_i$, where in this particular embodiment $G_i$ comprises air at atmospheric pressure and with a general composition of about 78 vol. % $N_2$ and 21 vol. % $O_2$. Compressor 101 receives the inlet air mixture $G_i$ and delivers the gas mixture at an elevated pressure to aeration unit 102 at the elevated pressure, where contact between the gas mixture and water occurs and the water establishes an equilibrium total dissolved gas species comprised of about 36 vol. % $O_2$ and 64 vol. % $N_2$, due to the respective Henry's coefficients of equations (1) and (2). Non-dissolved gases exit aeration unit 102 at 105. The non-dissolved gases exiting aeration unit 102 at 105 are deficient in $O_2$ and enriched with $N_2$, and contain a $O_2$ concentration lower than that in the inlet air mixture $G_i$ and the $N_2$ concentration higher than that in the inlet air mixture $G_i$. The non-dissolved gases may be used for some purposes to concentrate $N_2$ in the gas or to generate an $O_2$-deficient gas. Some portion of the aerated water comprising this total dissolved gas composition is then discharged to deaeration unit 103, which has a reduced pressure such that a large proportion of $O_2$ and $N_2$ gases effervesce within deaeration unit 103. Generally the reduced pressure in deaeration unit 103 remains greater than the saturation pressure of water at the prevailing temperature, and the degasification generates an outlet gas mixture of about 36% vol. % $O_2$ and 64 vol. % $N_2$ in deaeration unit 103. This gas mixture exits at 106 while pump 104 recirculates deaerated water back to aeration unit 102 for continued operation. Concurrently, the outlet gas mixture at 106 is received by a second enrichment sub-unit 107 having similar components and operating in a similar manner, such that the gas mixture of about 36 vol. % $O_2$ and 64 vol. % $N_2$ at 106 is further enriched to a gas mixture of about 55 vol. % $O_2$ and 45 vol. % $N_2$ at 108. This is progressively continued with additional enrichment sub-units 109, 111, and 113 to generate a gas mixture of about 72 vol. % $O_2$ and 28 vol. % $N_2$ at 110, about 85 vol. % $O_2$ and 15 vol. % $N_2$ at 112, and a final mixture $G_f$ of about 92 vol. % $O_2$ and 8 vol. % $N_2$ at 114.

Figure 2:
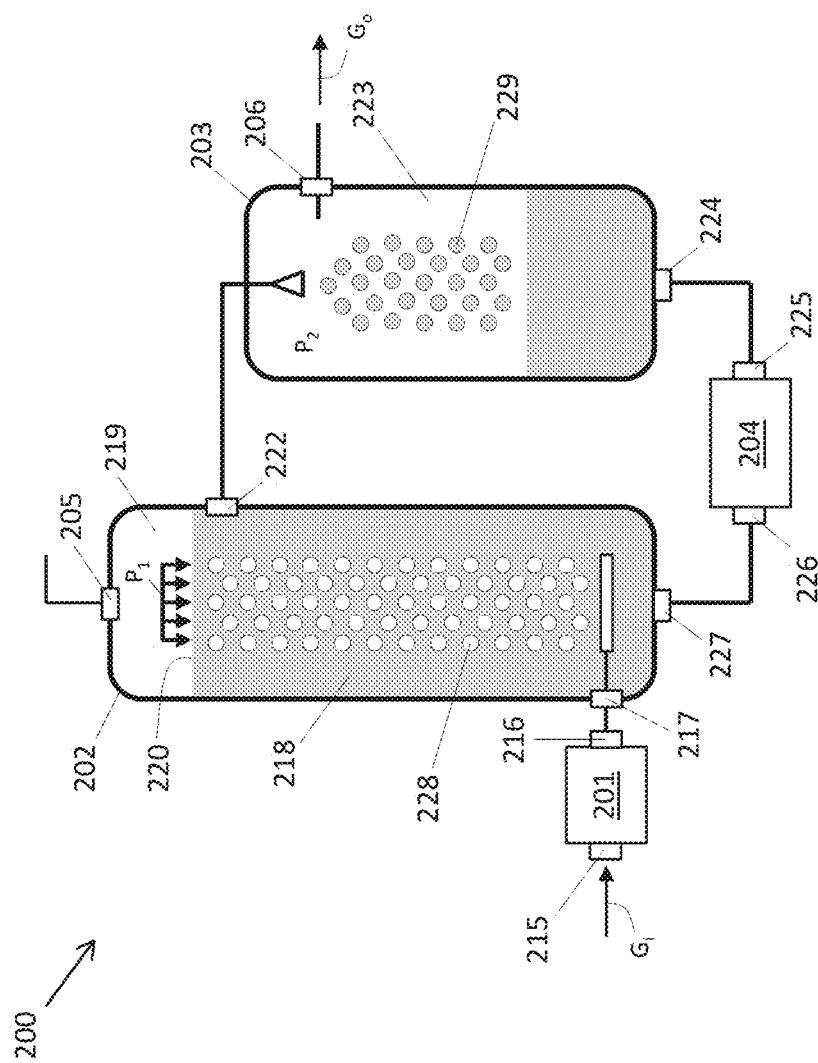
FIG. 2 illustrates an embodiment of an enrichment sub-unit.

An embodiment of an enrichment sub-unit is illustrated at FIG. 2 and generally indicated at 200. The enrichment sub-unit comprises a compressor 201 having a compressor inlet 215 and a compressor outlet 216. Enrichment sub-unit 200 is further comprised of aeration unit 202. Aeration unit 202 contains water and surrounds a volume of the water indicated at 218, and additionally surrounds an exhaust gas mixture at 219. Additionally, a first pressure $P_1$ acts on a surface 220 of the volume of the water 218, and the volume of the water 218 is generally at a first temperature. Further, aeration unit 202 comprises water inlet 227, gas inlet 217 in fluid communication with compressor outlet 216, aerated water outlet 222 in fluid communication with the volume of the water 218, and exhaust gas outlet 205 in fluid communication with exhaust gas mixture 219.

Enrichment sub-unit 200 further comprises deaeration unit 203 in fluid communication with aerated water outlet 222. Deaeration unit 203 additionally surrounds a deaeration volume 223 at a second pressure and a second temperature, where the second pressure is less than the first pressure acting in aeration unit 202, and greater than the saturation pressure of water at the second temperature. In a particular embodiment, the second temperature of the deaeration unit is within about 20° C. of the first temperature of the aeration unit. Deaeration unit 203 further comprises an enriched gas outlet 206 in fluid communication with deaeration volume 223, and further comprises deaerated water outlet 224.

Enrichment sub-unit 200 additionally comprises pump 204 having pump suction 225 and pump discharge 226, where pump suction 225 is in fluid communication with deaerated water outlet 224 of deaeration unit 203 and pump discharge 226 is in fluid communication with water inlet 227 of aeration unit 202.

In operation, enrichment sub-unit functions by receiving an inlet gas stream $G_i$ at compressor inlet 215 at an initial pressure less than the first pressure $P_1$. The inlet gas stream $G_i$ comprises $O_2$ and $N_2$ present in an initial $O_2$ vol. % and an initial $N_2$ vol. % and present in an initial $O_2$ quantity and an initial $N_2$ quantity, where the initial $O_2$ vol. % is a volume percent of $O_2$ in the inlet gas stream and the initial $N_2$ vol. % is a volume percent of $N_2$ in the inlet gas stream, and the initial $O_2$ quantity is a mass of $O_2$ in the inlet gas stream and the initial $N_2$ quantity is a mass of $N_2$ in the inlet gas stream. Typically the inlet gas stream $G_i$ is air generally at atmospheric pressure and containing about 21 vol. % $O_2$ and 78 vol. % $N_2$. Compressor 201 compresses the inlet gas stream $G_i$ from the initial pressure to at least the first pressure and generates a compressor discharge at compressor outlet 216. The compressor discharge is directed through gas inlet 217 into aeration unit 202 and establishes contact with the water in aeration unit 202.

Close contact between the $O_2$ and $N_2$ gases of the compressor discharge and the water at the second pressure of aeration unit 202 generates dissolution of oxygen and nitrogen into the water in aeration unit 202 in order to meet the conditions of equations (1) and (2). See e.g. Wang, L. K. et al., *Handbook of Environmental Engineering, Volume 12: Flotation Technology*, pp. 49-83, among others. Generally the water entering aeration unit 202 via water inlet 227 contains dissolved gases at less than equilibriums based on the prevailing conditions of aeration unit 202, which will be discussed. This generates an aerated water comprising dissolved oxygen and dissolved nitrogen in aeration unit 202, where the dissolved oxygen is some portion of the initial $O_2$ quantity of inlet gas stream $G_i$ and the dissolved nitrogen is some portion of the initial $N_2$ quantity of inlet gas stream $G_i$, and the aerated water approaches equilibrium with the $O_2$ and $N_2$ mixture issuing from the compressor discharge. Within the aerated water, a ratio of dissolved oxygen to dissolved nitrogen is dependent on the initial $O_2$ vol. % and initial $N_2$ vol. % of inlet gas stream $G_i$, and approaches the ratio of the initial $O_2$ vol. % to the initial $N_2$ vol. % multiplied by $H^{N2}/H^{O2}$ through the action of equations (1) and (2). For example, if the inlet gas stream $G_i$ is air containing about 21 vol. % $O_2$ and 78 vol. % $N_2$ at about room temperature, this typically generates an aerated water in aeration unit 202 having a total dissolved gas species comprised of about 36 vol. % $O_2$ and 64 vol. % $N_2$, as previously discussed. Concurrent with this dissolution some portion of the initial $N_2$ quantity and typically some portion of the initial $O_2$ quantity exit the water in aeration unit 202 and enter exhaust gas mixture at 219. The aerated water and the exhaust gas mixture are separated within aeration unit 202 through some mechanism such gravity, fluid rotation, or some other known means such that the exhaust gaseous mixture is in fluid communication with exhaust gas outlet 205 and the aerated water is in fluid communication with aerated water outlet 222, and some portion of the exhaust gas mixture is discharged through exhaust gas outlet 205. The discharged gas from exhaust gas outlet 205 generally comprises a higher $N_2$ concentration and lower $O_2$ concentration than those in the inlet gas stream $G_i$.

At FIG. 2, aeration unit 202 is an air diffusion aerator where the compressor discharge contacts the volume of the water 218 as a plurality of bubbles, such as bubble 228. The use of an air diffusion aerator as depicted may be advantageous for dissolution due to the continuous exposure of the plurality of bubbles to water surfaces, as well as the control times afforded through control of bubble size and ascendant velocity. However, other aeration units known in the art may be utilized, such as a spray towers, packed towers, and others. See e.g. Treybal, R. E., *Mass Transfer Operations*, among others. Aeration unit 202 may be any aeration unit where an inlet gas stream comprising $O_2$ and $N_2$ are brought into intimate contact with water under conditions such that at least some portion of the initial $O_2$ quantity of the inlet gas stream dissolves in the water to generate a dissolved oxygen, and at least some portion of the initial $N_2$ quantity of the inlet gas stream dissolves in the water to generate a dissolved nitrogen, and a resulting aerated water and exhaust gas mixture are separated as described. In a particular embodiment, the aerated water has an oxygen saturation greater than 50%, preferably greater than 70%, where the oxygen saturation denotes a ratio of the concentration of dissolved oxygen to the maximum equilibrium dissolved oxygen concentration of water at the temperature and pressure conditions within aeration unit 202. In a further embodiment, water entering the aeration unit at the water inlet has an oxygen saturation less than 70%, and preferably less than 50%.

At FIG. 2, the aerated water is discharged through aerated water outlet 222 and into the deaeration volume 223 of deaeration unit 203. As discussed, deaeration volume 223 of deaeration unit 203 is at a second pressure and a second temperature, where the second pressure is less than the first pressure $P_1$ acting in aeration unit 202, and where the second pressure is greater than the saturation pressure of water at the second temperature. In a particular embodiment, the second temperature of the deaeration unit is within about 20° C. of the first temperature of the aeration unit. Due to the reduced pressure of deaeration volume 223, some portion of the dissolved $O_2$ and the dissolved $N_2$ degasses from the aerated water to generate an enriched gaseous mixture comprising degassed $O_2$ and degassed $N_2$. The degasification additionally generates a deaerated water, where the deaerated water comprises some portion of the aerated water less the degassed $O_2$ and the degassed $N_2$. In an embodiment, the pressure reduction is such that at least 60% of the dissolved $O_2$ in the aerated water becomes degassed $O_2$ in deaeration unit 203. The deaerated water and the enriched gas mixture are separated within deaeration unit 203 through some mechanism such gravity, fluid rotation, or some other known means such that the enriched gas mixture is in fluid communication with enriched gas outlet 206 and the deaerated water is in fluid communication with deaerated water outlet 224. An outlet gas stream $G_o$ is generated by discharging the enriched gas mixture from deaeration unit 203 through enriched gas outlet 206.

Outlet gas stream $G_o$ has a final $O_2$ vol. % and a final $N_2$ vol. %, where the final $O_2$ vol. % is a volume percent of $O_2$ in outlet gas stream $G_o$ and the final $N_2$ vol. % is a volume percent of the $N_2$ in the outlet gas stream $G_o$. Within this method, aeration unit 202, deaeration unit 203, and the attendant first and second pressures are operated so that the final $O_2$ vol. % of outlet gas stream $G_o$ is greater than the initial $O_2$ vol. % of inlet gas stream $G_i$, and the final $N_2$ vol. % of outlet gas stream $G_o$ is less than the initial $N_2$ vol. % of inlet gas stream $G_i$. Following the deaeration, the deaerated water is drawn through deaerated water outlet 224 into pump inlet 225 and pumped by pump 204 through pump outlet 226 and water inlet 227, where the replenished water is added to the water contained in aeration unit 202.

Generally deaeration unit 203 produces deaerated water largely by presenting a reduced total pressure to the aerated water to provoke degasification. In an embodiment, the second pressure of deaeration unit 203 is at least 2 atmospheres less than the first pressure $P_1$ acting within aeration unit 202. In another embodiment, the second pressure is at least 30 atmospheres less than the first pressure $P_1$. Such a reduction in the pressure $P_{TOTAL}$ of equations (1) and (2) drives the degasification as the aerated water seeks to establish a new equilibrium at the reduced pressure. The reduced pressure and degasification also drives the total dissolved gases within the deaerated water to a level less than the equilibrium values which would be expected under the conditions of the aeration unit 202, so that dissolution of oxygen and nitrogen may occur as described in aeration unit 202 following recirculation of the deaerated water. In an embodiment, as discussed, the second pressure of deaeration unit 203 is such that the deaerated water entering the aeration unit as replenished water has an oxygen saturation less than 70%, and preferably less than 50% of the maximum equilibrium dissolved oxygen concentration of water expected at the temperature and pressure conditions within aeration unit 202.

Additionally, typically deaeration unit 203 operates generally in the absence of any type of stripping gas, and gaseous environments within deaeration unit 203 are comprised almost entirely of degassed $O_2$ and degassed $N_2$ which originated in the inlet gas stream. In a particular embodiment, the deaeration volume of deaeration unit 203 surrounds a gaseous deaeration atmosphere substantially devoid of any type of stripping gas, and at least 90 vol. % of the gaseous deaeration atmosphere is comprised of the enriched gaseous mixture of degassed $O_2$ and $N_2$.

At FIG. 2, deaeration unit 203 is a spray tower where the aerated water enters deaeration volume 223 as a plurality of droplets, such as droplet 229, however any deaeration unit known in the art may be utilized where an aerated water is subjected to a reduced pressure such that a dissolved oxygen degasses to generate an degassed $O_2$ in the deaerator, and a resulting deaerated water and enriched gas mixture are separated as described. Additionally, compressor 201 may be any means known in the art for increasing the pressure of a gas, provided compressor 201 is capable of increasing the pressure of the inlet gas stream sufficiently to generate discharge at the first pressure in aeration unit 202. In an embodiment, compressor 201 is a centrifugal or reciprocating compressor. Similarly, pump 204 may be any means known in the art for displacing or causing the displacement of a liquid, provided pump 204 is capable of transferring water from deaeration unit 203 to aeration unit 202 under the prevailing pressure conditions of deaeration unit 203 and aeration unit 202. In an embodiment, pump 204 is a centrifugal or positive-displacement pump.

Enrichment sub-unit 200 may thereby receive an inlet gas stream $G_i$ of air with an initial $O_2$ vol. % $O_{2(i)}$ and an initial $N_2$ vol. % $N_{2(i)}$ and generate an outlet gas stream $G_o$ having a final $O_2$ vol. % $O_{2(f)}$ and a final $N_2$ vol. % $N_{2(f)}$, where a ratio $(O_2/N_2)_f$ approaches or equals the ratio $(O_2/N_2)_i$ multiplied by $H^{N2}/H^{O2}$ in the aeration unit due to the relationships described by equations (1) and (2). In a particular embodiment, aeration unit 202 and deaeration unit 203 are operated so that enrichment sub-unit 200 generates an outlet gas stream $G_o$ having a ratio $(O_2/N_2)_f$ equal to at least 80% of the $(O_2/N_2)_i$ multiplied by $H^{N2}/H^{O2}$.

Figure 3:
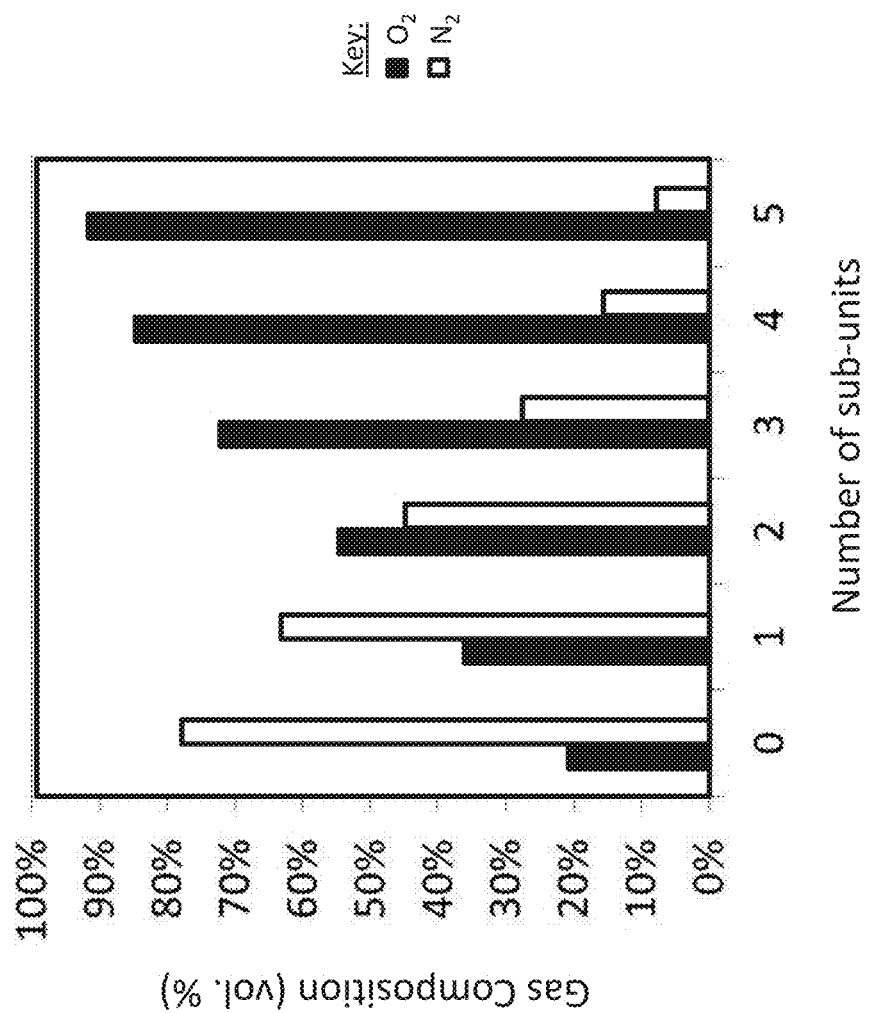
FIG. 3 illustrates the volume percent of an $O_2$ and $N_2$ gas mixture during sequential progression through a plurality of enrichment sub-units.

As previously discussed, the ratio of the final $(O_2/N_2)_f$ and the final $O_2$ vol. % may be additionally increased by delivering the outlet gas stream $G_o$ to an additional enrichment sub-unit comprising an additional compressor, an additional aeration unit, an additional deaeration unit, and an additional pump, and allowing the additional enrichment sub-unit to operate on the outlet gas stream $G_o$ and further increase the $(O_2/N_2)$ ratio. Additional enrichment sub-units may be sequentially added and the resulting $(O_2/N_2)$ ratio further increased until a resulting final $O_2$ vol. % equals or exceeds an established target $O_2$ vol. %. For example, if a target $O_2$ vol. % of 90 vol. % is established, an inlet gas stream of air with an initial $O_2$ vol. % of about 21 vol. % and an initial $N_2$ vol. % of about 78 vol. % may be provided to enrichment sub-unit 100 of FIG. 1 to generate an outlet gas stream of about 36 vol. % $O_2$ and 64 vol. % $N_2$ at 106, which may then be delivered to enrichment sub-unit 107 to generate an outlet gas stream of about 55 vol. % $O_2$ and 45 vol. % $N_2$ at 108, which may then be delivered to enrichment sub-unit 109 to generate an outlet gas stream of about 72 vol. % $O_2$ and 28 vol. % $N_2$ at 110, which may then be delivered to enrichment sub-unit 111 to generate an outlet gas stream of about 85 vol. % $O_2$ and 15 vol. % $N_2$ at 112, and finally delivered to enrichment sub-unit 113 to generate an outlet gas stream of about 92 vol. % $O_2$ and 8 vol. % $N_2$ at 114, in order to meet the target $O_2$ vol. % of at least 90 vol. %. The resulting outlet gas streams generated by enrichment sub-units 100, 107, 109, 111, and 113 operated in this manner are illustrated at FIG. 3.

Thus, provided here is a method of enriches an inlet air stream comprising $O_2$ and $N_2$ by repeated dissolution and degassing of oxygen and nitrogen in water. The methodology provides a manner in which the relationship between the respective Henry's coefficients of the oxygen and nitrogen in water may be exploited to enrich the $O_2$ vol. % and diminish the $N_2$ vol. % over repeated dissolution and degasification cycles. By utilizing a number of enrichment sub-units connected in series, where each enrichment sub-unit conducts both a dissolution and degasification cycle, the water contained in each enrichment sub-unit acts to progressively increase the $O_2$ vol. % until the $O_2$ vol. % equals or exceeds a target $O_2$ vol. %.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A process for enriching an inlet gas stream using water comprising:
   identifying a target $O_2$ volume percent, where the target $O_2$ volume percent is at least 90% volume percent of $O_2$;
   obtaining an enrichment sub-unit where the enrichment sub-unit comprises,
   a compressor where the compressor comprises a compressor inlet and a compressor outlet,
   an aeration unit containing water and comprising a gas inlet in fluid communication with the compressor outlet, where the aeration unit surrounds a volume of the water and surrounds an exhaust gas mixture, and where a first pressure acts on a surface of the volume of the water and where the volume of the water is at a first temperature, and where the aeration unit further comprises a water inlet and an aerated water outlet and an exhaust gas outlet, where the aerated water outlet is in fluid communication with the volume of the water, and where the exhaust gas outlet is in fluid communication with the exhaust gas mixture,
   a deaeration unit in fluid communication with the aerated water outlet, where the deaeration unit comprises an enriched gas outlet and a deaerated water outlet and surrounds a deaeration volume in fluid communication with the enriched gas outlet, where the deaeration volume has a second pressure and a second temperature, where the second pressure is at least 30 atm less than the first pressure and where the second pressure is greater than the saturation pressure of water at the second temperature, where the first temperature of the volume of the water in the aeration unit is within 20° C. of the second temperature of the deaeration volume of the deaeration unit,
   a pump comprising a pump suction and a pump discharge, where the pump suction is in fluid communication with the deaerated water outlet of the deaeration unit and the pump discharge is in fluid communication with the water inlet of the aeration unit;
   producing a compressor discharge by receiving the inlet gas stream at an initial pressure at the compressor inlet, where the initial pressure is less than the first pressure, and where the inlet gas stream has an initial $O_2$ volume percent and an initial $N_2$ volume percent and comprises an initial $O_2$ quantity and an initial $N_2$ quantity, where the initial $O_2$ volume percent is a volume percent of $O_2$ in the inlet gas stream and the initial $N_2$ volume percent is a volume percent of $N_2$ in the inlet gas stream, where the initial $O_2$ volume percent is less than the target $O_2$ volume percent, and where the initial $O_2$ quantity is a mass of $O_2$ in the inlet gas stream and the initial $N_2$ quantity is a mass of $N_2$ in the inlet gas stream, and compressing the inlet gas stream with the compressor to generate a compressor discharge at the compressor outlet, thereby producing the compressor discharge;
   producing an aerated water by directing some portion of the compressor discharge to the gas inlet of the aeration unit and injecting the some portion of the compressor discharge into the aeration unit and generating contact between the some portion of the compressor discharge and some portion of the water of the aeration unit, and generating a dissolved oxygen and a dissolved nitrogen in the water of the aeration unit, where the dissolved oxygen is a portion of the initial $O_2$ quantity dissolved in the water of the aeration unit and where the dissolved nitrogen is a portion of the initial $N_2$ quantity dissolved in the water of the aeration unit, and generating the aerated water, where the aerated water is a solution comprising the dissolved oxygen and the dissolved nitrogen as solutes and the water of the aeration unit as a solvent, and allowing at least another portion of the initial $N_2$ quantity to enter the exhaust gaseous mixture, and separating the exhaust gaseous mixture and the aerated water in the aeration unit such that the exhaust gaseous mixture is in fluid communication with the exhaust gas outlet and the aerated water is in fluid communication with the aerated water outlet, and discharging some portion of the exhaust gaseous mixture through the exhaust gas outlet, thereby producing the aerated water;

producing a deaerated water and an enriched gaseous mixture by discharging a quantity of the aerated water from the aerated water outlet of the aeration unit and directing the quantity of the aerated water to the deaeration volume of the deaeration unit, and allowing some portion of the dissolved oxygen and some portion of the dissolved nitrogen to transfer from the quantity of the aerated water at the second pressure and generate the enriched gaseous mixture and the deaerated water in the degasification vessel, where the enriched gaseous mixture comprises a degassed $O_2$ and a degassed $N_2$ and where the deaerated water comprises some portion of the aerated water less the degassed $O_2$ and the degassed $N_2$, and separating the enriched gaseous mixture and the deaerated water in the deaeration unit such that the enriched gaseous mixture is in fluid communication with the enriched gas outlet of the deaeration unit and the deaerated water is in fluid communication with the deaerated water outlet of the deaeration unit, thereby producing the deaerated water and the enriched gaseous mixture;

producing an outlet gas stream by discharging the enriched gaseous mixture from the enriched gas outlet of the deaeration unit, where the outlet gas stream has a final $O_2$ volume percent and a final $N_2$ volume percent, where the final $O_2$ volume percent is a volume percent of $O_2$ in the outlet gas stream and the final $N_2$ volume percent is a volume percent of the $N_2$ in the outlet gas stream, and where the final $O_2$ volume percent is greater than the initial $O_2$ volume percent and the final $N_2$ volume percent is less than the initial $N_2$ volume percent, thereby producing the outlet gas stream;

producing a replenished water by drawing the deaerated water through the deaerated water outlet of the deaeration unit into the pump inlet and pumping the deaerated water through the pump outlet and through the water inlet and adding the replenished water to the water of the aeration unit using the pump, thereby producing the replenished water;

continuing to conduct the producing the compressor discharge step, the producing the aerated water step, the producing the deaerated water and the enriched gaseous mixture step, the producing the outlet gas mixture step, and the producing the replenished water step by utilizing some portion of the replenished water as the some portion of the water of the naeration unit;

adding an additional enrichment sub-unit comprising an additional compressor, an additional aeration unit, an additional deaeration unit, and an additional pump, and repeating the producing the compressor discharge step, the producing the aerated water step, the producing the deaerated water and the enriched gaseous mixture step, the producing the outlet gas stream step, the producing the replenished water step, and the continuing to conduct step, by using the additional compressor of the additional enrichment sub-unit for the compressor of the enrichment sub-unit, and by using the additional aeration unit of the additional enrichment sub-unit for the aeration unit of the enrichment sub-unit, and by using the additional deaeration unit of the additional enrichment sub-unit for the deaeration unit of the enrichment sub-unit, and by using the additional pump of the additional enrichment sub-unit for the pump of the enrichment sub-unit, and by using the outlet gas stream as the inlet gas stream, and generating an additional outlet gas stream at an additional gas outlet of the additional deaeration unit;

repeating the adding step until the additional outlet gas stream has the final $O_2$ volume percent greater than or equal to the target $O_2$ volume percent, thereby enriching the inlet air stream using water.

2. The method of claim 1 further comprising generating contact between the some portion of the compressor discharge and the some portion of the water of the aeration unit until an oxygen saturation of the aerated water is equal to at least 50% of the maximum equilibrium dissolved oxygen concentration of water at the first pressure and the first temperature of the aeration unit.

3. The method of claim 2 further comprising maintaining the second pressure and the second temperature in the deaeration volume such that at least 60% of the dissolved oxygen and at least 60% of the dissolved nitrogen in the quantity of the aerated water transfers from the quantity of the aerated water.

4. The method of claim 3 where the deaeration volume surrounds a gaseous deaeration atmosphere, and further comprising producing the deaerated water and the enriched gaseous mixture in a manner where at least 90 vol. % of the gaseous deaeration atmosphere is comprised of the enriched gaseous mixture.

5. The method of claim 4 further comprising generating contact between the some portion of the compressor discharge and the some portion of the water of the aeration unit and further comprising transferring the some portion of the dissolved oxygen from the quantity of the aerated water and transferring the some portion of the dissolved nitrogen from the quantity of the aerated water until an oxygen saturation of the deaerated water is less than 70% of the maximum equilibrium dissolved oxygen concentration of water at the first pressure and the first temperature of the aeration unit.

6. The method of claim 3 where the second pressure is at least 30 atmospheres less than the first pressure in each enrichment sub-unit comprises at least five enrichment sub-units.

7. The method of claim 1 where the surface of the volume of the water is a free surface of the volume of water and where injecting the some portion of the compressor discharge into the aeration unit comprises injecting a plurality of gaseous bubbles into the volume of water.

8. The method of claim 1 where the water of the aeration unit comprises a plurality of water droplets and where generating contact between the some portion of the compressor discharge and the water of the aeration unit comprises contacting some portion of the plurality of water droplets and the some portion of the compressor discharge.

* * * *